US009626242B2

(12) United States Patent
Healy et al.

(10) Patent No.: US 9,626,242 B2
(45) Date of Patent: Apr. 18, 2017

(54) MEMORY DEVICE ERROR HISTORY BIT

(71) Applicant: International Business Machines Corporation, Armonk, NY (US)

(72) Inventors: Michael B. Healy, Cortlandt Manor, NY (US); Hillery C. Hunter, Chappaqua, NY (US); Charles A. Kilmer, Essex Junction, VT (US); Kyu-hyoun Kim, Chappaqua, NY (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/751,382

(22) Filed: Jun. 26, 2015

(65) Prior Publication Data
US 2016/0328291 A1    Nov. 10, 2016

Related U.S. Application Data

(63) Continuation of application No. 14/707,024, filed on May 8, 2015.

(51) Int. Cl.
G06F 11/00 (2006.01)
G08C 25/00 (2006.01)
H03M 13/00 (2006.01)
H04L 1/00 (2006.01)
(Continued)

(52) U.S. Cl.
CPC .......... *G06F 11/1004* (2013.01); *G06F 3/064* (2013.01); *G06F 3/0619* (2013.01); *G06F 3/0653* (2013.01); *G06F 3/0659* (2013.01); *G06F 3/0673* (2013.01); *G06F 3/0683* (2013.01); *G06F 11/1076* (2013.01)

(58) Field of Classification Search
CPC .... G06F 11/1076; G06F 3/0619; G06F 3/064; G06F 3/0683
See application file for complete search history.

(56) References Cited

U.S. PATENT DOCUMENTS

| 7,376,868 B2 | 5/2008 | Yoshizawa et al. |
| 2009/0292971 A1* | 11/2009 | Man .................... G06F 11/1068 714/763 |
| 2013/0024742 A1 | 1/2013 | Nazarian et al. |

(Continued)

FOREIGN PATENT DOCUMENTS

| CN | 101346697 A | 1/2009 |
| CN | 101346697 B | 11/2012 |

OTHER PUBLICATIONS

Anonymous, "Using Selective Memory State Inversion to Extend the Life of Nonvolatile Memory," ip.com, Nov. 7, 2014, 4 pages, IP.com No. 000239452.

(Continued)

Primary Examiner — Sam Rizk
(74) Attorney, Agent, or Firm — Joseph W. Cruz

(57) ABSTRACT

Classifying memory errors may include accessing data from a location within a memory array of a memory device. The memory array may include at least one bit field to store memory error classification information. One or more memory errors in the data may be determined. One or more memory errors may further be classified. In response to the classifying, memory error classification information may be stored as one or more bit values within the bit field.

9 Claims, 6 Drawing Sheets

(51) Int. Cl.
*G06F 11/10* (2006.01)
*G06F 3/06* (2006.01)

(56) References Cited

U.S. PATENT DOCUMENTS

| | | |
|---|---|---|
| 2013/0179751 A1 | 7/2013 | Linstadt |
| 2014/0082453 A1 | 3/2014 | Sikdar et al. |
| 2015/0199233 A1* | 7/2015 | Pelley ................ G06F 11/1076 714/764 |

OTHER PUBLICATIONS

Bull et al., "A Power-Efficient 32 bit ARM Processor Using Timing-Error Detection and Correction for Transient-Error Tolerance and Adaptation to PVT Variation," IEEE Journal of Solid-State Circuits, vol. 46, No. 1, pp. 18-31, Jan. 2011, DOI: 10.1109/JSSC.2010.2079410.

Park et al., "Future Cache Design using STT MRAMs for Improved Energy Efficiency: Devices, Circuits and Architecture," DAC 2012, Jun. 3-7, 2012, 6 pages, San Francisco, California, Copyright 2012 ACM.

Healy et al., "Memory Device Error History Bit", U.S. Appl. No. 14/707,024, filed May 8, 2015.

List of IBM Patents or Patent Applications Treated as Related.

* cited by examiner

MEMORY DEVICE ERROR HISTORY BIT

BACKGROUND

This disclosure relates generally to memory devices, and more specifically, to implementing one or more history bits within a memory array to store memory error classification information.

A memory error is an event that leads to the logical state where the values read from one or more bits are different from the values that were last written. Memory errors, such as Direct Random Access Memory (DRAM) errors, are a concern because they can lead to machine crash or applications using corrupted data. Memory errors can be caused by electrical or magnetic interference (e.g., due to cosmic rays), problems with the hardware (e.g., a bit being permanently damaged), or can result from corruption along a data path between the memories and the processing elements. Memory errors can be classified as either soft errors, which randomly corrupt bits but do not leave physical damage, or hard errors, which corrupt bits in a repeatable manner due to physical defects in a memory device or data path.

Memory systems in server machines may employ error detecting and correcting mechanisms, including, for example, error correcting codes (ECC). ECC memories allow the detection and correction of single or multiple bit errors. An error may be referred to as an uncorrectable error (UE) when the number of bits affected by the error exceed the number of bits that the EEC can correct. When this occurs, a machine may be forced to shut down. An error is a correctable error (CE) when a system can reliably detect and correct at least a single erroneous bit. For example, single-error correcting and double-error detecting (SECDED) systems can detect double bit errors, but may only be able to correct single-bit errors.

SUMMARY

Various embodiments are directed to a computer-implemented method, a system, and a memory device for classifying memory errors. Data may be accessed from a location within a memory array of a memory device. The memory array may include at least one bit field to store memory error classification information. One or more memory errors in the data may be determined. Moreover, the one or more memory errors may be classified. Memory error classification information as one or more bit values within the bit field may be stored.

Figure 1:
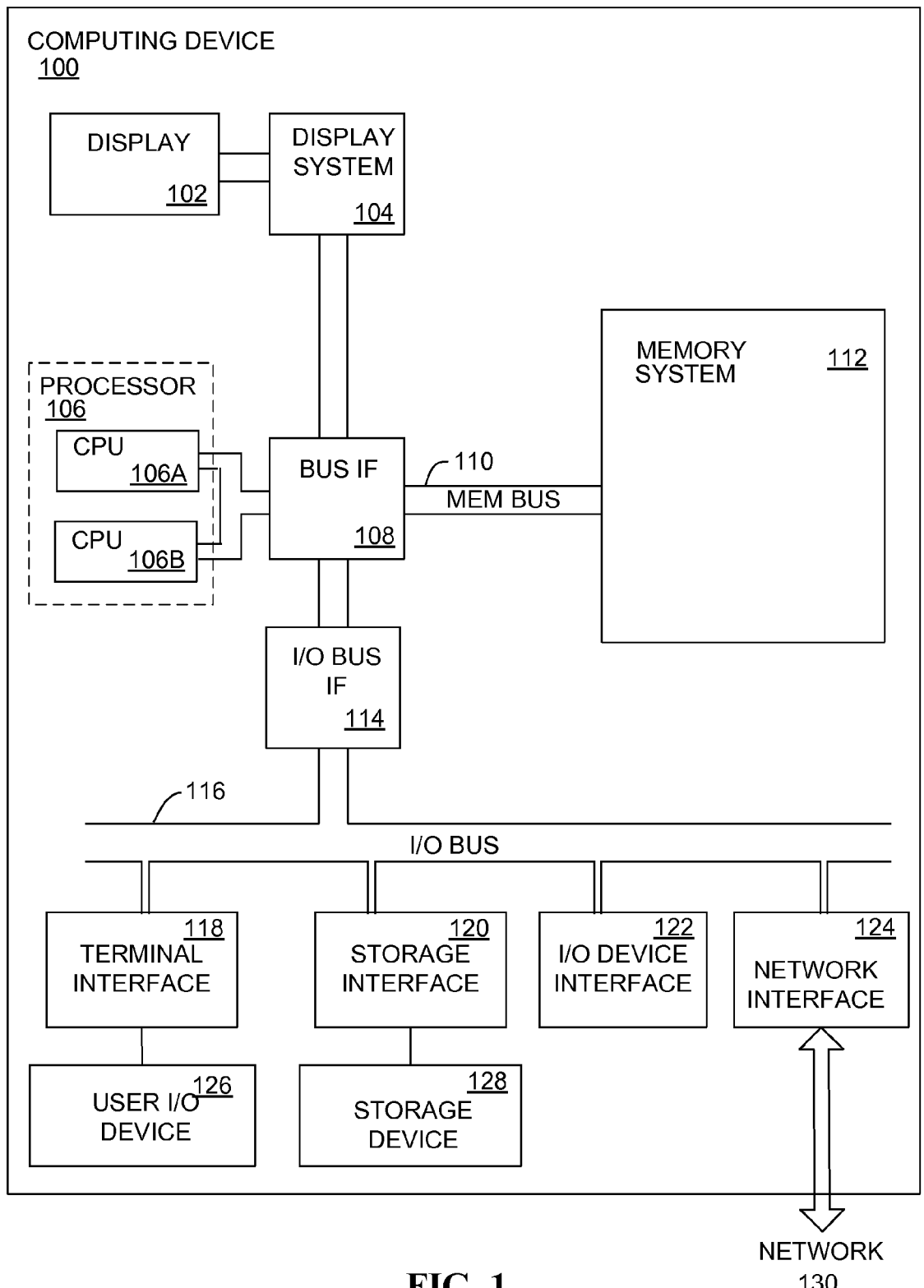
FIG. 1 is a block diagram illustrating an example computing device that includes a memory system, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to memory devices, more particular aspects relate to implementing one or more history bits within a memory array to store memory error classification information. While the present disclosure is not necessarily limited to such applications, various aspects of the disclosure may be appreciated through a discussion of various examples using this context.

Data may be received and transmitted through bits, which are the smallest units of data in a computing system. Bits may be expressed using "0" or "1," and can be grouped together to create binary codes or messages (e.g., 8 bit message 10110001). In some examples, memory devices that can detect memory errors may include an extra "check" bit (e.g., parity bit) added on to a regular binary code sequence (e.g., 9 bit binary code 101100010). Depending on the system, the parity bit may help identify a memory error. In a system using even parity, for example, if the sum of all bits having a value of one in a binary code is even, the binary code may have "even parity" and may be error free. In the same system, when the sum of all bits having a value of one in a binary code is odd, the binary code may have an error (e.g., at least one bit value has flipped).

In some examples, ECC memory devices may employ one or more additional parity or check bits to correct memory errors. ECC memory may correct memory errors by matching an original copy of a code word (e.g., 64 bit message plus additional parity bits) with a corresponding code word read from memory. The algorithms that may be utilized for ECC error correction are described herein. In some examples, at a first time, an encoder may encode (write) an encrypted code word sequence to memory. At a second time, when the code word is read from the memory, the stored ECC original code word may be compared against the code word that is generated when the data was read the second time. If the code word that was read does not match the stored code word, the code word that was read may be decrypted by a decoder to determine which parity bit was in error. The error may then be corrected by the decoder.

In various examples, when a memory error is discovered and reported to a host device (e.g., memory controller) and/or an end user (e.g., a person), there may not be enough information available to monitor memory health. For example, a user may not know whether the error is a known (e.g., previously detected) or new, and the user may not know whether the error is a soft or hard error. The user may desire to distinguish these errors to perform accurate memory health monitoring. For example, the user may want to eliminate hard errors or known errors as an assessment of progressive memory health. Alternatively, the user may want to know if an error is a hard error to know whether the user should replace or repair the memory devices causing the hard error. Further, a user may not know whether an error persists because it is not correctible. Accordingly, embodiments of the present disclosure are directed to implementing a history bit within a memory array of a memory device to classify memory errors and monitor memory health. For example, the history bit may be updated to determine whether an error is a known error or new error, and to provide feedback accordingly. The history bit may also be updated to determine whether the error is a soft error or hard error, and to provide feedback accordingly. The history bit may further be updated to determine whether an error is a correctable error or uncorrectable error. Moreover, the history bit may be updated to determine that an error was uncorrectable at a first time, but became correctable at a second time. The history bit may thus help facilitate accurate memory health monitoring by classifying progressive errors.

FIG. 1 is a block diagram illustrating an example computing device that includes a memory system, according to embodiments. The components of the computing device 100 can include one or more processors 106, a memory system 112, a terminal interface 118, a storage interface 120, an Input/Output ("I/O") device interface 122, and a network interface 124, all of which are communicatively coupled, directly or indirectly, for inter-component communication via a memory bus 110, an I/O bus 116, bus interface unit ("IF") 108, and an I/O bus interface unit 114.

The computing device 100 may include one or more general-purpose programmable central processing units (CPUs) 106A and 106B, herein generically referred to as the processor 106. In an embodiment, the computing device 100 may contain multiple processors; however, in another embodiment, the computing device 100 may alternatively be a single CPU device. Each processor 106 executes instructions stored in the memory system 112.

The computing device 100 may include a bus interface unit 108 to handle communications among the processor 106, the memory system 112, the display system 104, and the I/O bus interface unit 114. The I/O bus interface unit 114 may be coupled with the I/O bus 116 for transferring data to and from the various I/O units. The I/O bus interface unit 114 may communicate with multiple I/O interface units 118, 120, 122, and 124, which are also known as I/O processors (IOPs) or I/O adapters (IOAs), through the I/O bus 116. The display system 104 may include a display controller, a display memory, or both. The display controller may provide video, audio, or both types of data to a display device 102. The display memory may be a dedicated memory for buffering video data. The display system 104 may be coupled with a display device 102, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 104 may be on board an integrated circuit that also includes the processor 106. In addition, one or more of the functions provided by the bus interface unit 108 may be on board an integrated circuit that also includes the processor 106.

The I/O interface units support communication with a variety of storage and I/O devices. For example, the terminal interface unit 118 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 126 and the computing device 100, may receive output data via the user output devices. For example, a user interface may be presented via the user I/O device 126, such as displayed on a display device, played via a speaker, or printed via a printer.

The storage interface 120 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 may be implemented via any type of secondary storage device. The contents of data within the memory system 112, or any portion thereof, may be stored to and retrieved from the storage device 128 as needed. The I/O device interface 122 provides an interface to any of various other I/O devices or devices of other types, such as printers or fax machines. The network interface 124 provides one or more communication paths from the computing device 100 to other digital devices and computer systems.

Although the computing device 100 shown in FIG. 1 illustrates a particular bus structure providing a direct communication path among the processors 106, the memory system 112, the bus interface 108, the display system 104, and the I/O bus interface unit 114, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 114 and the I/O bus 108 are shown as single respective units, the computing device 100, may include multiple I/O bus interface units 114 and/or multiple I/O buses 116. While multiple I/O interface units are shown, which separate the I/O bus 116 from various communication paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

In an embodiment, the memory system 112 may include a random-access semiconductor memory, storage device, or storage medium (either volatile or non-volatile) for storing or encoding data and programs. The memory system 112 may represent the entire virtual memory of the computing device 100, and may also include the virtual memory of other computer systems coupled to the computing device 100 or connected via a network 130. The memory system 112 may be a single monolithic entity, but in other embodiments the memory 112 may include a hierarchy of caches and other memory devices. For example, memory system 112 may exist in multiple levels of caches, and these caches may be further divided by function, so that one cache holds instructions while another holds non-instruction data, which is used by the processor. Memory system 112 may be further distributed and associated with different CPUs or sets of CPUs, as is known in any various so-called non-uniform memory access (NUMA) computer architectures. The memory system 112 is discussed further below.

FIG. 1 is intended to depict representative components of the computing device 100. Individual components, however, may have greater complexity than represented in FIG. 1. In FIG. 1, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different ways, including using various computer applications, routines, components, programs, objects, modules, data structures etc., which may be referred to herein as "software," "computer programs," or simply "programs."

Figure 2:
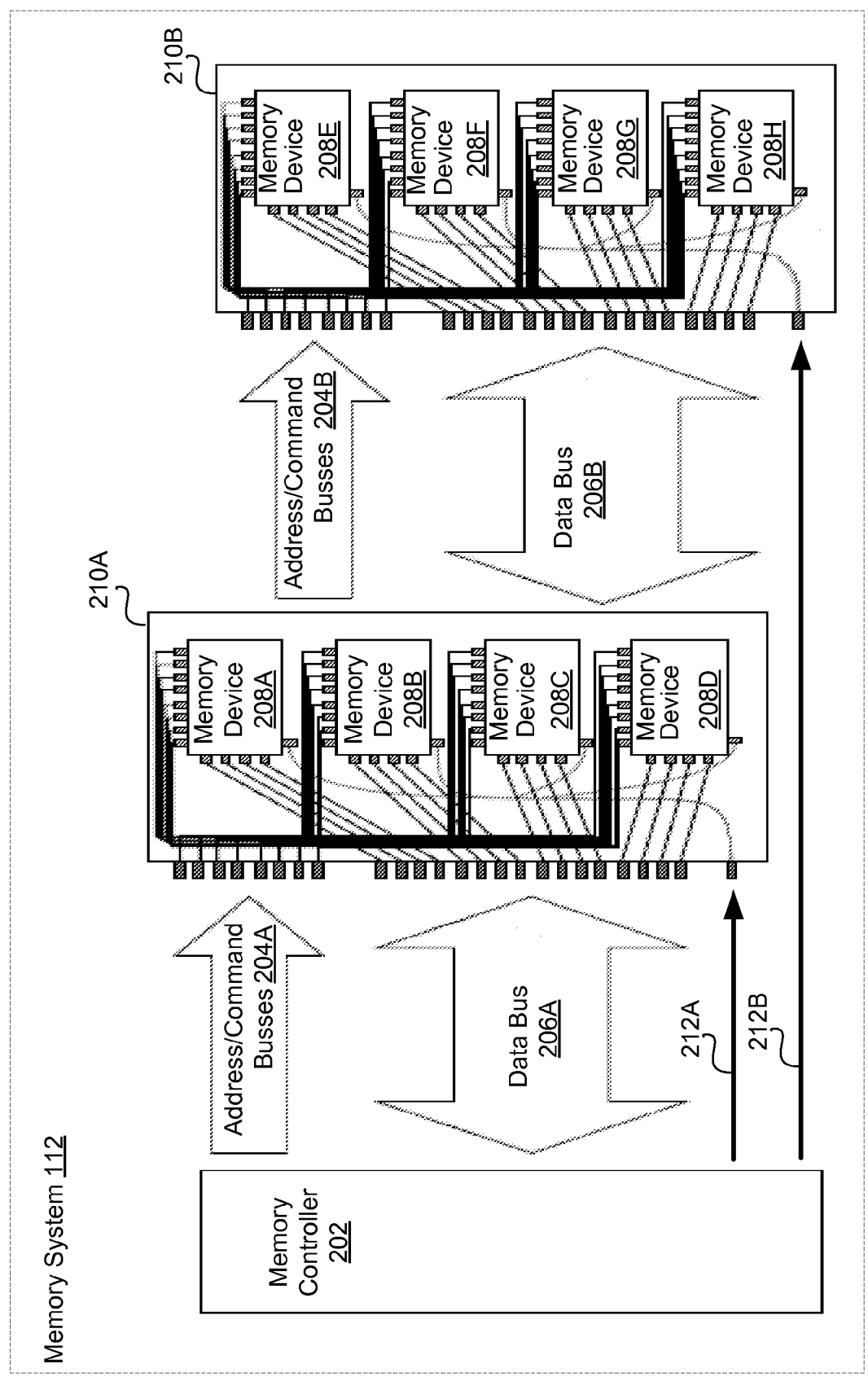
FIG. 2 is a block diagram illustrating an example of the memory system of FIG. 1, according to embodiments.

FIG. 2 is a block diagram illustrating an example of the memory system of FIG. 1, according to embodiments. Consistent with some embodiments, the memory system 112 may include a memory controller 202, address/command busses 204A and 204B, data buses 206A and 206B, chip select buses 212A and 212B (buses 204, 206, and 212 may correspond with the memory bus 110 of FIG. 1), and memory modules (e.g., ranks) 210A and 210B. The memory modules 210A and 210B may include respective memory devices 208 (e.g., DRAMS). For example, memory module 210A may include memory devices 208A, 208B, 208C, and 208D. Memory module 210B may include memory devices 208E, 208F, 208G, and 208H. The memory system 112 may also be registered (buffered), unbuffered, or fully buffered.

The memory controller 202 is a circuit that manages the flow of data to and from a computing device's memory. In some embodiments, the memory controller 202 may include a central processing unit (CPU) or a logic circuit. The CPU or logic circuit may be configured to control the general operation of the memory controller 202 in response to read/write requests by a computing device. The memory controller 202 may also include one or more buffers to temporarily store read/write data between transfers from the memory array 222 and the computing device. The memory controller 202 may support data flow from a computing device to a memory array via system buses (e.g., memory bus 110 of FIG. 1, address/command busses 204A and 204B, and data buses 206A and 206B). The memory controller 202 may also control the writing and reporting of various memory errors, according to embodiments. For example, the memory controller 202 may control the reporting of whether an error is uncorrectable versus correctable, a soft error or hard error, or an existing error or new error, as described further below. In some embodiments, the memory controller includes 202 ECC circuitry to detect and correct memory errors. In some embodiments, the memory controller 202 includes firmware for monitoring memory health and memory management (e.g., determine whether to replace memory, spare or mark memory as faulty, etc.). For example, the firmware may be a reliability, accessibility, and serviceability (RAS) module to assess and monitor memory health.

In some embodiments, address/command busses 204A and 204B are utilized to select a memory location within each of the memory devices 208. Address pins may be utilized for both row and column address selection within a memory array of the memory devices 208. In some embodiments, a host device (e.g., the memory controller 202) inputs an address without receiving a request from a user to update a history bit. In other embodiments, a user may issue a command to be performed at a particular address. For example, the user may issue a command to update a history bit within a memory array of the memory device 208 to indicate that an error is a hard error, as described further herein. In various other embodiments, other host devices may be utilized to select a memory location for updating a history bit. For example, the host device may be a processor, firmware module (e.g., RAS module), or other history bit circuitry. Although the width of the address/command busses 204A and 204B are illustrated as being 8-bits, the address/command busses can be any suitable width. For example, the bus width may be 16 bits or 32 bits, depending on the number of bits stored to each memory device 208.

In various embodiments, the data busses 206A and 206B are utilized for data input and output. For example, during a write operation to store a code word to memory, a data signal may be applied from the memory controller 202 to the data bus 206A and respective pins of the memory device 208. The data may then be translated to the appropriate signal levels and stored to the appropriate memory cell of a memory array (within the memory devices 208). The write operation with respect to the history bit is further described herein. Although the data busses 206A and 206B are illustrated as being 16 bits wide, the data buses 206A or 206B may be any suitable width. For example, the data buses may be 32 bits, 72 bits (accounting for ECC bits), etc.

In embodiments, the chip select busses 212A and 212B are utilized by the memory controller 202 to select an appropriate memory module 210A or 210B so as to enable (or block) input signals to the memory module needed for an operation. For example, when a user (or host device) issues a command to read data located within memory device 208B, chip select bus 212A may activate memory module 210A to allow the read to occur.

In some embodiments, each memory module 210A and 210B is an integrated circuit module mounted on a printed circuit board, and houses the memory devices 208. The memory modules 210A and 210B may be any suitable module. For example, the memory modules 210A or 210B may be a dual in-line memory module (DIMM), a single in-line memory module (SIMM), a single in-line pin package memory (SIPP), a Trans Flash memory module, or any other suitable memory module. Although each memory module 210A and 210B is illustrated as including 4 memory devices 208 per module (e.g., 208A, 208B, 208C, and 208D), the number of memory devices per module may be any suitable number. For example, in some embodiments, there are 9 memory devices 208 per module and one of the memory devices (e.g., 208A) is used solely to detect and correct memory errors (e.g., an ECC memory device). In some embodiments, there are 18 memory devices 208 in each module. In various embodiments, the memory modules 210A and 210B include any number of memory devices 208 as long as the number of memory devices is divisible by 3 or 5 to account for the ECC and/or history bit embodiments.

Figure 3:
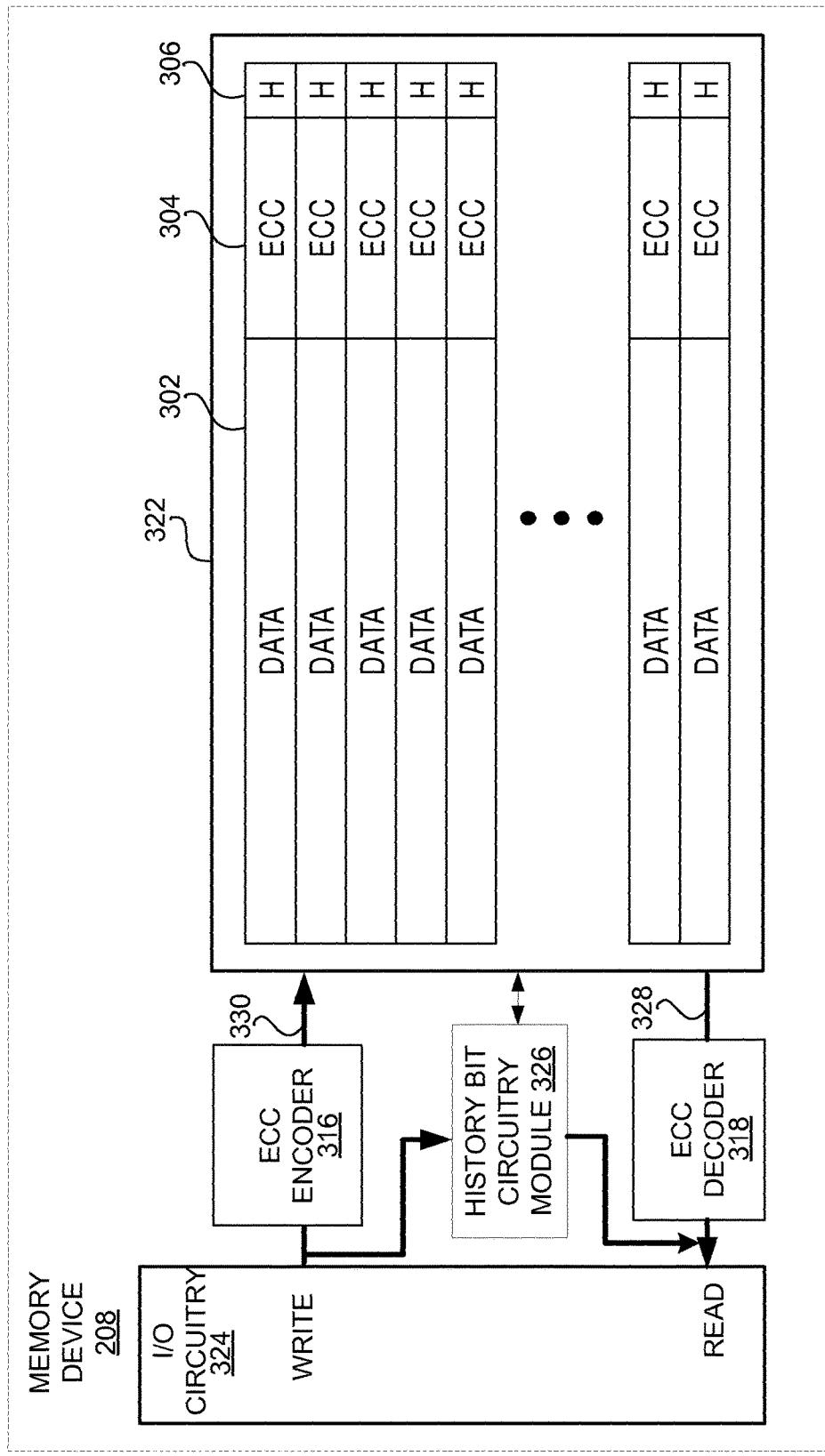
FIG. 3 is a block diagram of the example memory device of FIG. 2, according to embodiments.

FIG. 3 is a block diagram of the example memory device of FIG. 2, according to embodiments. In various embodiments, at least one of the memory devices 208 includes I/O circuitry 324, an ECC encoder 316, history bit circuitry module 326, an ECC decoder 318, and a memory array 322. In some embodiments, the ECC encoder 316 and ECC decoder 318 are located in a separate memory device 208 than the history bit circuitry module 326. In other embodiments, as illustrated in FIG. 3, they may be included in the same memory device 208. In other embodiments, in addition to memory devices 208, the memory controller 202 may have an ECC encoder 316 and ECC decoder 318 for detecting and/or correct memory errors. The I/O circuitry 324 may carry various write commands 330 and receive various read commands 328. The memory array 322 may include data words 302, respective ECCs 304, and a respective history bit field 306 that includes history bit value classification information. In some embodiments, the history bit field 306 is not included on the same chip as the data word 302 or ECC 304.

The memory device 208 may include various types of memory structures, as described in FIG. 1. The memory devices 208 may include phase change memory, ferroelectric random access memory (FRAM), magnetic random access memory (MRAM), direct random access memory (DRAM), static random access memory (SRAM), resistive random access memory (RRAM), etc.

In various embodiments, the I/O circuitry 324 provides read/write interface between the memory controller and one or more memory arrays 322 in a memory device 208. Although only one memory array 322 is illustrated, multiple memory arrays may be included in the memory device 208. The I/O circuitry 324 may include I/O pins that transmit and receive data and related signals to carry out data transfer operations to and from the memory array 322.

In embodiments, an ECC encoder 316 receives a write command from the I/O circuitry 324 to generate a code word to be written into memory for later memory error detection and correction during reads. For example, the ECC encoder 316 may generate one or more check bits for the data words 302 to generate an ECC 304. The ECC 304 and the data words 302 together may form a code word. In embodiments, each of the data words 302 may have an address and a corresponding ECC 304, as illustrated in FIG. 3. In embodiments, the memory array 322 may include a row and column decoder. Accordingly, when a write operation occurs, Row Address Select (RAS) (Strobe) circuitry may be utilized to latch the row address needed for the write, as described in more detail below. Moreover, Column Address Select (CAS) (Strobe) circuitry may be utilized to latch a column address and initiate the write (or read), as described in more detail below. In some embodiments, once the row and column address are latched, data 322 words and corresponding ECC 304 are written to the memory array 322.

In embodiments, the memory array 322 may utilize various error correction and detection mechanisms. For example, error detection mechanisms may include: ECC (as illustrated by ECC 304), Repetition Codes, Parity Bits, Checksums, Cyclic Redundancy Checks (CRCs), Cryptographic Hash functions, and/or any other suitable detection mechanism. Examples of error correction mechanisms include Automatic Repeat Request (ARQ) mechanisms, ECC (304), hybrid mechanisms, and/or any other suitable error correcting mechanisms.

In some embodiments, the ECC 304 used to detect and correct various errors may include different error correcting codes, such as block codes or convolution codes. For example the ECC 304 may be Hamming codes, Bose-Chaudur-Hocquengem (BCH) codes, Reed-Solomon (RS) codes, Low-Density parity check codes, or any other suitable ECC 304.

In some embodiments, the history bit circuitry module 326 is utilized to update the history bit field 306. History bit values within the history bit field 306 may provide a user additional information concerning potential memory errors in the data words 302. For example, once the ECC decoder 318 detects a memory error, the history bit circuitry module 326 may write a history bit value to specify whether an error is a known error (e.g., value of 1) or new error (e.g., value of 0), whether the error is a soft error (e.g., 1) or hard error (e.g., 0), whether the error is correctable, and whether the correctable error was uncorrectable at a previous time. These functions are further described below. In some embodiments, a user (or host device) may update the history bit field 306 (e.g., by issuing a write or history bit update command). In other embodiments, the history bit circuitry module 326 may include logic to update the history bit field 306. In some embodiments, a host device (e.g., memory controller RAS firmware) may update the history bit field 306. In some embodiments there may be only one history bit field 306 added to each data word 302 in a memory array 322 (as shown in FIG. 3). In alternative embodiments, there may be multiple history bit fields added to each data word in the memory array 322, with each history bit value corresponding to a different function of embodiments of the present disclosure. For example, to determine whether an error is a soft or hard error, a first history bit field may be utilized; and to determine whether the error is correctable or uncorrectable, a second history bit field may be utilized. In some embodiments, the history bit circuitry module 326 may mask the history bit field 306 when a write occurs for the data 302 and/or the ECC 304, as described in more detail below.

In embodiments, when data words 302 are read or requested, an ECC decoder 318 may be utilized to decode current code words for the data to detect and correct memory errors. For example, a first data word 302 within a first memory address may be read. The respective code word (e.g., data word 302 plus ECC 304) at the memory address may then be compared to the original code word that was written to the memory array 322 (e.g., via the ECC encoder 316). Accordingly, the ECC decoder 318 may extract the check bits and data bits from the code word. In embodiments, the ECC decoder 318 may recalculate the check bits and data word 302 bits to determine whether there is an error (e.g., check the syndrome to determine whether there is an even or odd parity, as described herein). If there is an error, the ECC decoder 318 may utilize the ECC 304 to correct the memory errors that are detected. In other embodiments, a memory controller (which may have ECC encoder 316 and ECC decoder 318 circuitry) may detect and/or correct memory errors.

Figure 4:
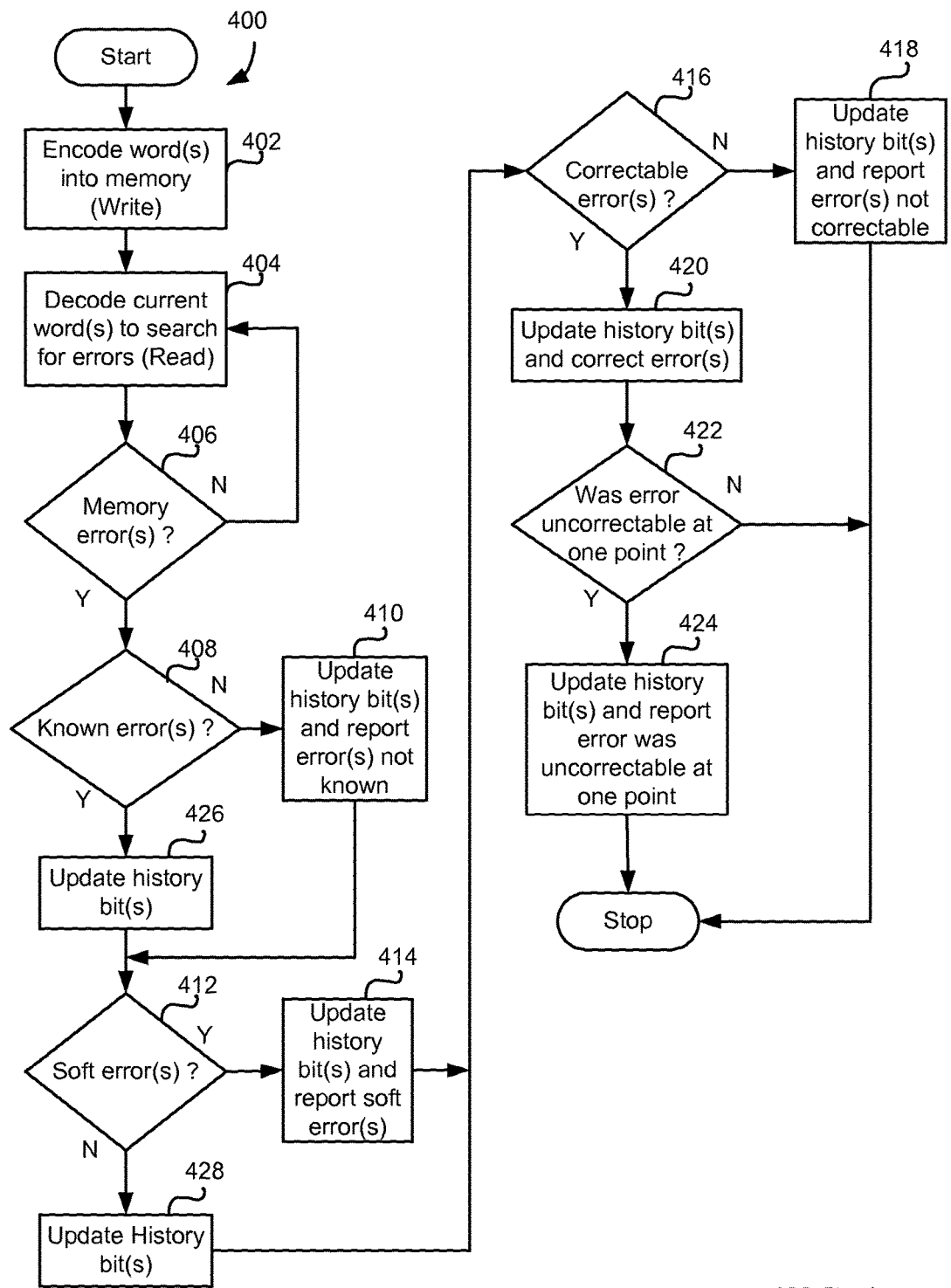
FIG. 4 is an example flow diagram of a process for classifying memory errors and updating one or more history bits accordingly.

FIG. 4 is an example flow diagram of a process for classifying memory errors and updating one or more history bits accordingly. The process 400 may start when a memory controller or encoder performs operation 402 to encode or write a code word into memory to store the code word for later data read error detection and correction. In an example, a memory controller may first write a unit of data to memory. The data may include several bit sequences. For example, a memory controller may write data having a value of 156 to memory, corresponding to the bit value sequence 10011100. The memory controller may also generate a plurality of parity bits to add on to each bit sequence being written. Using the example above, the memory controller may generate a parity bit and add the parity bit to the end of the bit sequence 10011100 to produce the sequence 100111001. Each parity bit may be used to determine whether an individual bit sequence contain errors. In some embodiments, a hashing algorithm may be utilized for data retrieval 8 bytes (64 bits) at a time. In embodiments, the parity bits and the data bit sequences may be stored as a code word in memory.

In operation 404, a memory controller or decoder may then decode various current code word sequences to search for memory errors. For example, a user may request the same data that was written to memory in operation 402. In embodiments, before the data is returned from a read request, a memory controller may generate a second code word for the data and compare the second code word of the current read, with the code word stored in memory (the code word from operation 402) to see if there is a match between the code words.

In some embodiments, in response to operation 404, a memory controller or ECC decoder may determine if there are any memory errors, as indicated by operation 406. In some embodiments, the memory controller or ECC decoder may determine operation 406 by comparing the generated code words read during data retrieval (operation 404) to the code words stored during the write phase (operation 402). In embodiments, if the code words match, that means there is no memory error, and the memory controller or ECC decoder may continue to perform operation 404 for different data reads until the memory controller discovers one or more memory errors.

In embodiments, if code words do not match (e.g., there is a memory error), then the history bit circuitry, ECC decoder, memory controller, or user may perform operation 408 to determine if the error(s) is a known error or a new error. In various embodiments, the remaining operations of process 400 (410, 412, 426, 414, 428, 416, 418, 420, 422, and 424) may be performed by any of these components or the user. In some embodiments, the history bit circuitry or other component may determine if the error(s) is a known error by reaching a repeatable memory error read threshold. For example, if a particular code word is read 5 times and all five times the exact word errors are occurring in the same memory location, then the data may be labeled as a "known" error. The repeatable read threshold may be any suitable number of reads. For example, an error may be categorized as a known error after a second, third, or fourth read of data at a particular memory address.

In some embodiments, if the error(s) is a known error, the history bit circuitry or other component may perform operation 426 to write a bit value to the history bit field of a memory array (e.g., to "1"). In some embodiments, more than one bit value may be written to more than one history bit field. In embodiments, the writing may be done during an initial memory scan or during run time (e.g., in real time when data is written to memory). In various embodiments, when a particular value is written to the history bit field (e.g., to "1"), no reporting is initiated. To "report" an error means that the memory controller or other host device may report to a second host device component (e.g., memory controller, display screen controller, etc.) or to a user (e.g., via indicia on a display screen) that an error is of a particular classification. In some embodiments if an error count is performed, the history bit circuitry may not include the known error in an error count, which means that the ECC memory device may not engage in correcting the error. In embodiments, if the error is not a known error (e.g., the error is a new error), then the history bit circuitry or user may perform operation 410 to update the corresponding history bit (e.g., to "0"). In some examples, in response to updating the history bit (e.g., to "0"), the memory controller or other component may report to a user or host device (e.g., memory controller), that the error is not known or is a new error.

In operation 412, the history bit circuitry or other component may determine if the error(s) is a soft or hard error. In some embodiments, the history bit circuitry or other component may be able to determine if the error is a hard error or soft error by first determining whether the error is a data transfer error or a storage error. For example, the memory controller may receive information concerning whether a remote host server is down, whether a file transfer file service is not functioning in the host, whether there is a malfunction in the service protocol, whether user credentials are not satisfied, or any other data transfer error. In some embodiments, error correcting components associated with data transfer errors may identify data transfer errors and request a re-transmission of the data before the data is received by the memory controller. In embodiments, if a data transfer error is ruled out, the history bit circuitry or other component may determine that a storage error has occurred (soft or hard error).

In some embodiments, the history bit circuitry or other component may be able to determine operation 412 (whether the error is a hard or soft error) by determining operation 408. Accordingly, if there is a repeatable read of incorrect data in the same memory location without the data being corrected, then the error may meet a repeatable read threshold, and may be labeled a known error (operation 408). Further, the same repeatable read threshold may be utilized to determine that an error is a hard error. For example, if a repeatable read of incorrect data occurred 5 times (repeatable read threshold), without the data being corrected because of a memory error in the same location, it may suggest that the problem is a hardware manufacturing defect. This may indicate that an error is a hard error, which may not be as correctable as soft errors. Alternatively, using the example above, an error may be deemed to be a soft error if the data was read 5 times and only the first read returned incorrect data. The repeatable read threshold may be any suitable threshold at any quantity, as discussed above. In some embodiments, the determining of a soft or hard error may be a separate determination than the known error (operation 408). For example, a repeatable read threshold for determining a hard or soft error may be a different quantity than the repeatable read threshold for determining a known error.

If the error(s) is not a soft error, then history bit circuitry or other component may perform operation 428 to update the history bit field (e.g., to value "1") to indicate that the error may be a hard error (physical damage). In embodiments, in response to updating the history bit field to indicate that the error may be a hard error, a reporting of such errors may not occur to better monitor progressive memory health. In some embodiments, however, the history bit circuitry or other component may report that a hard error has occurred in order to assess whether faulty computing device components need to be replaced or repaired. If the error is a soft error, then the history bit circuitry or other component may perform operation 414 to update the corresponding history bit (e.g., to 0) to indicate that a soft error was discovered. The history bit circuitry may then report that the error is a soft error.

In operation 416, the history bit circuitry or other component may determine if the error(s) is a correctable error. In embodiments, an error may be classified as a correctable error based on the error type (e.g., hard versus soft), and/or based on whether the ECC can correct the amount of errors it detects. For example, some systems may detect double bit errors, but only correct single bit errors (e.g., single-error correcting and double-error detecting (SECDED)). In an example illustration, errors may be correctable if the errors are new errors (not known errors) and/or soft errors, and the system can both detect the errors and correct them. Accordingly, if the errors are correctable, an ECC may perform operation 420 to correct the error. In some embodiments, the history bit circuitry or other component may also update the corresponding history bits (e.g., to "0") to indicate that the error is correctable. In some embodiments, when the history bit is updated to indicate that the error is correctable, the history bit circuitry or other component may employ logic to correct the error without reporting that the error is correctable. In embodiments, when the error is not correctable, the history bit circuitry or other component may perform operation 418 to update the history bit (e.g., to "1") to indicate that the error is not correctable and report accordingly.

In operation 422 after the correctable error has been corrected and reported, the history bit circuitry or other component may determine if the correctable error was uncorrectable at one point in time. This may be important to protect from a possible mis-corrected error, as the ECC may wrongly correct memory errors. If the correctable error was not uncorrectable at one point, the process 400 may stop. If the correctable error was uncorrectable at one point, the history bit circuitry or other component may perform operation 424 to update the corresponding history bit and report that the error was uncorrectable at one point. In an example, the history bit may be updated to "1" if the error was uncorrectable at one point, which may indicate that the correctable error was uncorrectable at one point and that a reporting needs to be done. After operation 424, the process 400 may stop.

Figure 5:
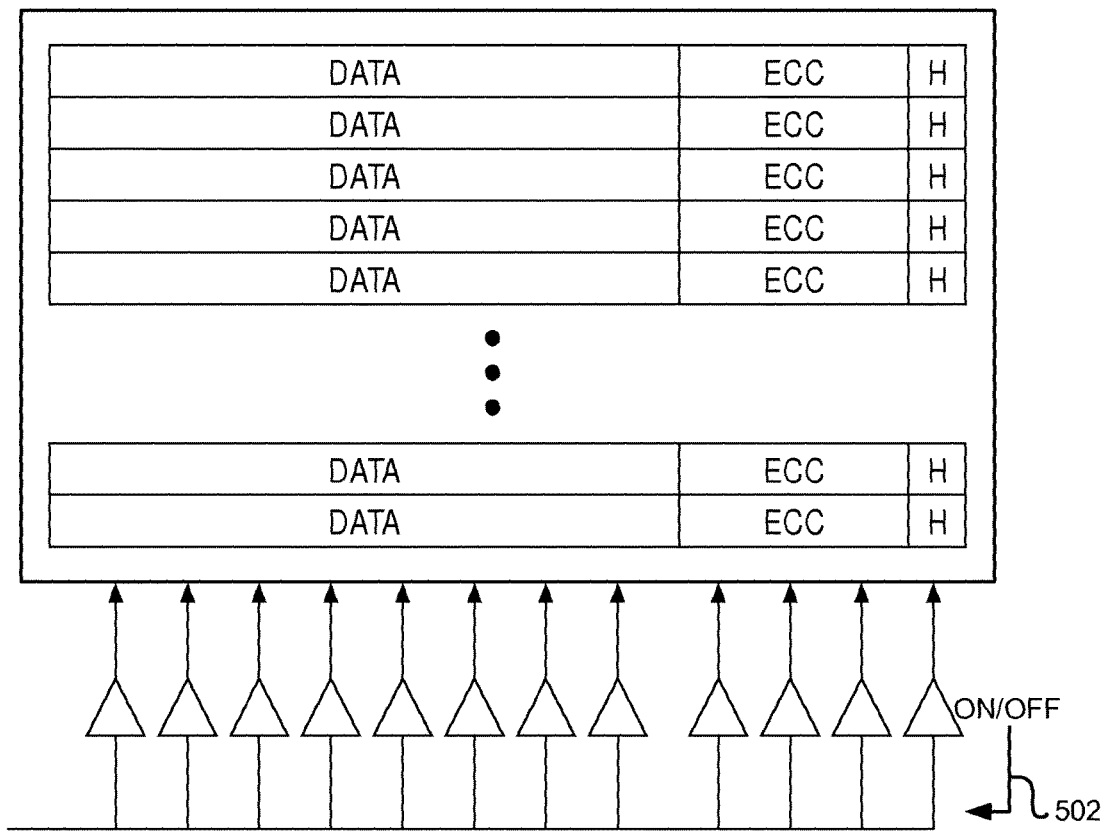
FIG. 5 is an example diagram illustrating that a history bit value within a history bit field may be masked during a data write, according to embodiments.

FIG. 5 is an example diagram illustrating that a history bit value within a history bit field may be masked during a data write, according to embodiments. Data masking 502 is the process of modifying or concealing original data so that the original data is not easily identified or recreated. When data, including check bits (e.g., a code word), is written to a memory at a first time, the history bit values may be masked 502 to prevent the bit from being written, as no assessment of errors has occurred yet. In other embodiments, the history bit may also be masked 502 during writes for memory error correction. For example, the history bit may be masked during both error detection and correction (i.e., a read-modify-write of the data). Accordingly, as illustrated in FIG. 5, although a write may occur to the data (e.g., to correct bits) and the ECC code words, the history bit may be masked 502 to avoid repeated read-modify-writes to the history bit field. By avoiding continuous read-modify-writes, system performance may be enhanced (e.g., increased throughput, etc.). A history bit circuitry or other component may therefore write to the history bit field at a different time than when an error is corrected to improve system performance. However, in other embodiments, the masking 502 function may be turned off such that the history bits are always updated during error correction (read-modify-writes). In various examples, masking 502 may occur through multiple methods. For example, masking may include substitution methods, encryption, shuffling methods, number and data variance, nulling out or deletion, masking out certain fields, any combination thereof, or any other method. Data masking 502 may also be "static" or "on-the-fly" (e.g., process of transferring data from environment to environment without the data touching disk on its way).

Figure 6:
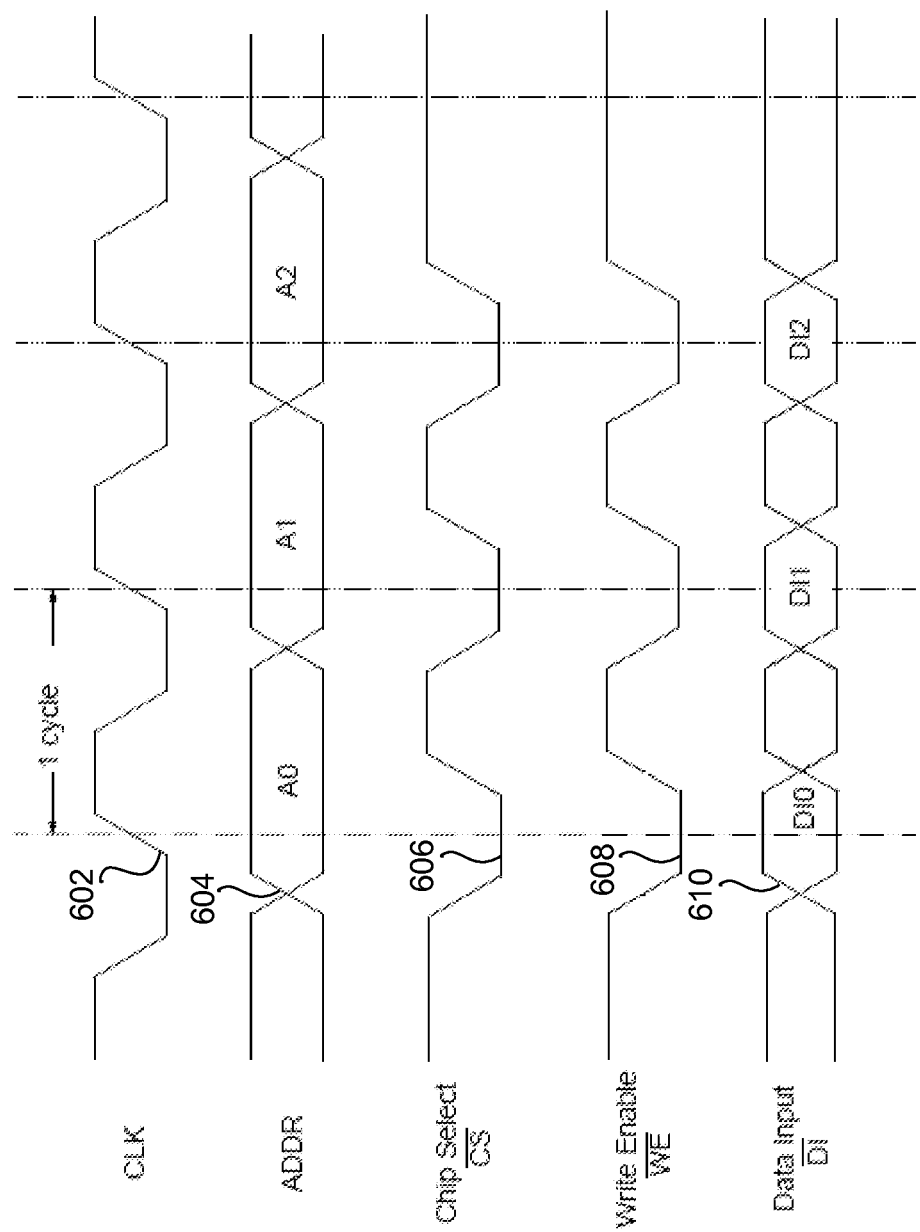
FIG. 6 is an example timing diagram illustrating how writing history bit data to memory may occur, according to embodiments.

FIG. 6 is an example timing diagram illustrating how writing history bit data to memory may occur, according to embodiments. In FIG. 6, the signals "CLK" (clock), "ADDR" (address), "Chip Select" (CS), Write Enable (WE), and Data Input (DI) may correspond to signals associated with, for example, the data and address busses that connect the memory controller to every memory device. In embodiments, the clock signal controls when input signals are latched at the beginning of a write operation, and when output signals appear at the output pins. In some embodiments, before the clock transition 602 (low to high voltage) that initiates the writing of the history bit, the row and column addresses are applied 604 to the address input pins (ADDR). In some embodiments, a Row Address Select (RAS) (Strobe) signal is used to latch the row address. Moreover, a Column Address Select (CAS) signal may latch the column address and initiate the read or write operation. In some embodiments, a user (or host device) may issue a command to update a history bit using these address signals.

In embodiments, a CS signal may be utilized to select a memory module or rank that includes the memory device (chip) that will be written to during a history bit update. In some embodiments, when the CS is low (voltage), input signals applied 606 to the rank's input pins may be latched after the appropriate clock transition. Alternatively, when the CS is high (voltage), input signals applied to the rank's input pins may never be latched.

WE is utilized to choose between a read and write operation. In embodiments, when WE is low 608, values applied at the memory device (e.g., DRAM) input pins may be written into the memory array history bit field (e.g., bit value "1" may be written to enable a write of a history bit to occur). In some embodiments, WE may be high (e.g., configured to read) to prevent writing to the history bit during a read-modify-write operation (error correction). In some embodiments, however, WE may be low for the writing into both the history bit field and during error correction. In these embodiments, when error correction occurs under the same low WE signal, a masking of the history bit(s) may occur, as described above, such that the updating of the history bits will not be included in a read-modify-write of the data.

In embodiments, during a write operation of the history bit, a bit value is applied at the data input pins (DI pins). The data may be translated into the appropriate signal and stored in the memory array as a history bit. In the illustration of FIG. 6, Data Input DIO (610) is written to the memory location with address A0. In an illustrative example, history bit circuitry may classify an error as a new error and update the history bit accordingly. Therefore, the history bit circuitry may write a "0" (e.g., DIO) to a history bit field within A0 to indicate that an error is a new error. Accordingly, the history bit circuitry or other component may report that the error is a new memory error.

What is claimed is:
1. A computer-implemented method for classifying memory errors, comprising:
   accessing data from a location within a memory array of a memory device, wherein the memory array includes at least one bit field to store memory error classification information;
   determining that there are one or more memory errors in the data;
   classifying the one or more memory errors, the classifying including determining whether the one or more memory errors is a correctable memory error or an uncorrectable memory error;
   determining that the one or more memory errors is the correctable memory error; and
   in response to the determining that the one or more memory errors is a correctable memory error, writing one or more bit values within the bit field to indicate that the one or more memory errors is the correctable memory error.

2. The method of claim 1, wherein the classifying the one or more memory errors includes determining whether the one or more memory errors is a hard memory error or a soft memory error, the determining including determining whether the one or more memory errors is a data transfer error or a storage error.

3. The method of claim 2, further comprising:
determining that the one or more memory errors is the soft memory error;
in response to the determining that the one or more memory errors is the soft memory error, writing the one or more bit values within the bit field to indicate that the one or more errors is a soft memory error; and
reporting to an end user that the one or more errors is a soft memory error.

4. The method of claim 1, wherein the classifying the one or more memory errors includes determining whether the one or more memory errors is a known memory error or a new memory error, the determining including determining whether the one or more memory errors have been previously detected, wherein the known memory error is an error that has been previously detected.

5. The method of claim 4, further comprising:
determining that the one or more memory errors is the new memory error; and
in response to the determining that the one or more memory errors is a new memory error, writing the one or more bit values within the bit field to indicate that the one or more memory errors is a new memory error and in response to the writing, reporting to a host device of a user that the one or more memory errors is a new memory error.

6. The method of claim 1, further comprising:
determining that the correctable memory error was the uncorrectable memory error at a particular time prior to becoming the correctable memory error;
writing the one or more bit values within the bit field to indicate that the correctable memory error was an uncorrectable memory error at the particular time; and
in response to the writing the one or more bit values within the bit field to indicate that the correctable memory error was an uncorrectable memory error and prior to the correcting, reporting to a host device that the correctable memory error was the uncorrectable memory error at the particular time in order to avoid possible mis-correction.

7. The method of claim 1, further comprising:
correcting, subsequent to the determining that the one or more memory errors is the correctable memory error, the one or more memory errors within the memory array;
masking, during the correcting, the bit field to avoid a read-modify-write to the bit field; and
subsequent to the masking and the determining, performing the writing the one or more bit values to the bit field to indicate that the one or more memory errors is the correctable memory error.

8. A computer-implemented method for classifying memory errors, comprising:
accessing data from a location within a main memory array of a memory device, wherein the memory array includes: a first bit field, a second bit field, and a third bit field to store memory error classification information, the first bit field indicating whether an error is a hard error or soft error, the second bit field indicating whether the error is a known error or a new error, the third bit field indicating whether the error is a correctable error or an uncorrectable error;
determining that there are one or more memory errors in the data;
classifying the one or more memory errors; and
in response to the classifying, populating each of the first bit field, the second bit field, and the third bit field.

9. A computer-implemented method for classifying memory errors, comprising:
accessing data from a location within a main memory array of a memory device, wherein the memory array includes: a first bit field, a second bit field, and a third bit field to store memory error classification information, the first bit field indicating whether an error is a hard error or soft error, the second bit field indicating whether the error is a correctable error or an uncorrectable error, the third bit field indicating whether the correctable error was the uncorrectable error at a particular time prior to becoming the correctable error;
determining that there are one or more memory errors in the data;
classifying the one or more memory errors; and
in response to the classifying, selectively reporting the one or more memory errors based on the classification, wherein the soft error is reported and the hard error is not reported, and wherein the correctable memory error is not reported and the uncorrectable error is reported, and wherein the correctable error is only reported when the correctable error was the uncorrectable error at the particular time prior to becoming the correctable error.

* * * * *